United States Patent [19]
Gulick et al.

[11] Patent Number: 5,870,622
[45] Date of Patent: Feb. 9, 1999

[54] COMPUTER SYSTEM AND METHOD FOR TRANSFERRING COMMANDS AND DATA TO A DEDICATED MULTIMEDIA ENGINE

[75] Inventors: Dale Gulick; Andy Lambrecht; Mike Webb; Larry Hewitt, all of Austin; Brian Barnes, Round Rock, all of Tex.

[73] Assignee: Advanced Micro Devices, Inc., Sunnyvale, Calif.

[21] Appl. No.: 948,639

[22] Filed: Oct. 10, 1997

Related U.S. Application Data

[63] Continuation of Ser. No. 479,780, Jun. 7, 1995, abandoned.

[51] Int. Cl.$^6$ .................................................. G06F 13/12
[52] U.S. Cl. .................... 395/800.35; 395/840; 395/842; 345/502; 345/522; 345/526
[58] Field of Search ................... 395/800.01, 800.35, 395/842, 840; 345/502, 522, 526

[56] References Cited

U.S. PATENT DOCUMENTS

| | | | |
|---|---|---|---|
| 4,245,344 | 1/1981 | Richter | 395/183.19 |
| 5,245,322 | 9/1993 | Dinwiddie, Jr. et al. | 345/115 |
| 5,404,522 | 4/1995 | Carmon et al. | 395/677 |
| 5,452,289 | 9/1995 | Sharma et al. | 370/286 |
| 5,497,373 | 3/1996 | Hulen | 370/259 |
| 5,508,940 | 4/1996 | Rossmere et al. | 345/328 |
| 5,564,001 | 10/1996 | Lewis | 345/302 |

FOREIGN PATENT DOCUMENTS

| | | | |
|---|---|---|---|
| 0 537 932 A3 | 4/1993 | European Pat. Off. | H04N 7/133 |
| 94/10641 | 5/1994 | WIPO | G06F 15/62 |

OTHER PUBLICATIONS

PCI Local Bus—*PCI Multimedia Design Guide*—Revision 1.0—Mar. 29, 1994, 43 pages.
Kettler et al, "Scheduling Analysis . . . Multimedia Applications," IEEE, May 1994, pp. 403–414.

*Primary Examiner*—Meng-Ai T. An
*Assistant Examiner*—John Follansbee
*Attorney, Agent, or Firm*—Conley, Rose & Tayon; Jeffrey C. Hood; Louis H. Iselin

[57] ABSTRACT

A computer system and method for transferring multimedia commands and data to a dedicated multimedia engine and/or multimedia memory, wherein the multimedia engine provides increased performance for real-time applications over current computer architectures. The system includes a dedicated multimedia engine coupled directly to the main memory which performs real-time operations, including audio and video function, as well as others. The multimedia engine includes multimedia memory and one or more DSP engines. The CPU writes video and/or audio commands and data to the main memory. The CPU also preferably writes data structure information to the DMA engine which includes the main memory address where the commands and data reside. The DMA engine uses this information to retrieve the commands and data from main memory into the multimedia memory. The DMA engine preferably operates concurrently with the multimedia engine, thus allowing for improved performance. In an alternate embodiment, the CPU writes the main memory address space information to the multimedia engine, and the multimedia engine retrieves the commands and data from main memory into the multimedia memory prior to performing operations using the data.

29 Claims, 8 Drawing Sheets

COMPUTER SYSTEM AND METHOD FOR TRANSFERRING COMMANDS AND DATA TO A DEDICATED MULTIMEDIA ENGINE

This application is a continuation of application Ser. No. 08/479,780, filed Jun. 7, 1995, now abandoned.

FIELD OF THE INVENTION

The present invention relates to a computer system and method for transferring commands and data to a dedicated multimedia memory, wherein a multimedia engine performs video and audio processing on data in the multimedia memory to provide improved performance for real-time applications.

DESCRIPTION OF THE RELATED ART

Computer architectures generally include a plurality of devices interconnected by one or more various buses. For example, modern computer systems typically include a CPU coupled through bridge logic to main memory. The bridge logic also typically couples to a high bandwidth local expansion bus, such as the peripheral component interconnect (PCI) bus or the VESA (Video Electronics Standards Association) VL bus. Examples of devices which can be coupled to local expansion buses include video accelerator cards, audio cards, telephony cards, SCSI adapters, network interface cards, etc. An older type expansion bus is generally coupled to the local expansion bus. Examples of such expansion buses included the industry standard architecture (ISA) bus, also referred to as the AT bus, the extended industry standard architecture (EISA) bus, or the microchannel architecture (MCA) bus. Various devices may be coupled to this second expansion bus, including a fax/modem, sound card, etc.

Personal computer systems were originally developed for business applications such as word processing and spreadsheets, among others. However, computer systems are currently being used to handle a number of real time applications, including multimedia applications having video and audio components, video capture and playback, telephony applications, and speech recognition and synthesis, among others. These real time applications typically require a large amount of system resources and bandwidth.

One problem that has arisen is that computer systems originally designed for business applications are not well suited for the real-time requirements of modem multimedia applications. For example, modem personal computer system architectures still presume that the majority of applications executing on the computer system are non real-time business applications such as word processing and/or spreadsheet applications, which execute primarily on the main CPU. In general, computer systems have not traditionally been designed with multimedia hardware as part of the system, and thus the system is not optimized for multimedia applications. Rather, multimedia hardware is typically designed as an add-in card for optional insertion in an expansion bus of the computer system.

In many cases, multimedia hardware cards situated on an expansion bus do not have the required access to system memory and other system resources for proper operation. For example, a multimedia hardware card situated on the PCI expansion bus must first arbitrate for control of the PCI bus before the device can access system memory. In addition, since the computer system architecture is not optimized for multimedia, multimedia hardware cards generally do not make efficient use of system resources. As an example, multimedia hardware cards typically include their own memory in addition to system memory. For example, video accelerator cards are typically configured with one to four Megabytes of video RAM. Audio cards, video capture cards, and other multimedia cards are also generally configured with dedicated on-board memory. This requirement of additional memory adds undesirable cost to the system.

As multimedia applications become more prevalent, multimedia hardware will correspondingly become essential components in personal computer systems. Therefore, an improved computer system architecture is desired which is optimized for real-time multimedia applications as well as for non-realtime applications. In addition, improved methods are desired for transferring real-time data to multimedia hardware.

SUMMARY OF THE INVENTION

The present invention comprises a computer system and method optimized for real-time applications which provides increased performance over current computer architectures. The system includes a dedicated multimedia engine and dedicated multimedia memory coupled directly to the main memory. The multimedia engine executes commands and data from the multimedia memory to perform a number of real-time operations, including audio and video functions, as well as others. The computer system of the present invention provides much greater performance for real-time applications than prior systems.

The computer system includes a CPU coupled through chip set or bridge logic to main memory. The bridge logic also couples to a local expansion bus such as the PCI bus. Various devices may be connected to the PCI bus, including a hard drive, network interface card, etc. The bridge logic and main memory are also coupled through a local bus to a dedicated multimedia engine as well as dedicated multimedia memory. The multimedia memory may reside either in the multimedia engine or external to the engine. A direct memory access (DMA) engine is preferably coupled to the multimedia memory.

The multimedia engine includes one or more DSP engines which comprise either one or more general purpose DSP engines or dedicated audio and video engines. The one or more DSP engines couple through one or more I/O channels to respective I/O ports, including video, audio and communication ports. The multimedia engine includes video ports for coupling to a video monitor, audio ports for coupling to an audio DAC or speakers, and one or more communication ports.

According to the present invention, the CPU writes video and/or audio commands and data to the main memory. The CPU also preferably writes data structure information to the DMA engine which includes the main memory address where the commands and data reside. The DMA engine uses this information to retrieve the commands and data from main memory into the multimedia memory. The DMA engine preferably operates concurrently with the multimedia engine, thus allowing for improved performance. In an alternate embodiment, the CPU writes the main memory address space information to the multimedia engine, and the multimedia engine retrieves the commands and data from main memory into the multimedia memory prior to performing operations using the data.

The CPU writes video and/or audio commands and data to the main memory instead of directly to the multimedia memory to minimize CPU access to the multimedia memory. This ensures that the multimedia engine has full access to the multimedia memory. Further, the multimedia engine retrieves commands and data from the main memory only when necessary, and the DSP engine is not "locked out" of the multimedia memory due to CPU writes. The CPU and the multimedia engine arbitrate for the main memory as well as for the multimedia memory. The CPU preferably has priority access to the main memory, and the multimedia engine preferably has priority access to the multimedia memory.

Therefore, the present invention comprises a novel computer system architecture and method which increases the performance of real-time applications. A dedicated multimedia engine and multimedia memory are coupled directly to the main memory. The CPU transfers multimedia commands and data to the main memory and provides location information to either a DMA engine or to the multimedia engine. The multimedia commands and data are then retrieved from the main memory to the multimedia memory when the data is needed, and this preferably occurs concurrently with multimedia engine operations.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

*PCI System Architecture* by Tom Shanley and Don Anderson and available from Mindshare Press, 2202 Buttercup Dr., Richardson, Tex. 75082 (214) 231-2216, is hereby incorporated by reference in its entirety.

The Intel Peripherals Handbook, 1994 and 1995 editions, available from Intel Corporation, are hereby incorporated by reference in their entirety. Also, data sheets on the Intel 82430FX PCIset chipset, also referred to as the Triton chipset, are hereby incorporated by reference in their entirety, including the 82430 Cache Memory Subsystem data sheet (Order No. 290482-004), the 82420/82430 PCIset ISA and EISA bridge data sheet (Order No. 290483-004), and the Intel 82430FX PCIset Product Brief (Order No. 297559-001), all of which are available from Intel Corporation, Literature Sales, P.O. Box 7641, Mt. Prospect, Ill. 60056-7641 (1-800-879-4683), and all of which are hereby incorporated by reference in their entirety.

Computer System Block Diagram

Figure 1:
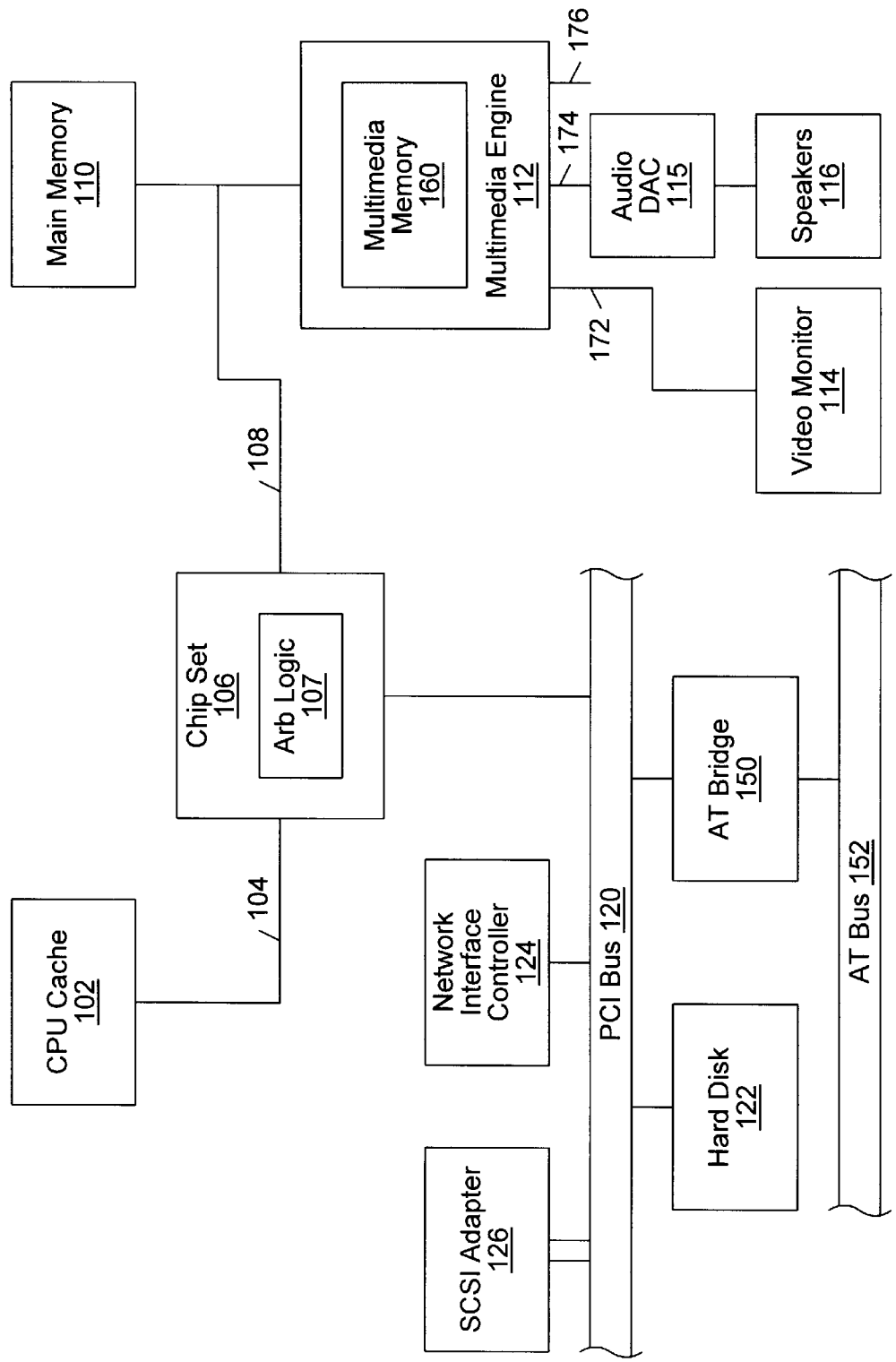
FIG. 1 is a block diagram of a computer system including a multimedia engine according to the present invention.

Referring now to FIG. 1, a block diagram of a computer system according to the present invention is shown. As shown, the computer system includes a central processing unit (CPU) 102 which is coupled through a CPU local bus 104 to a host/PCI/cache bridge or chipset 106. The chipset 106 includes arbitration logic 107 as shown. The chipset 106 is preferably similar to the Triton chipset available from Intel Corporation, including certain arbiter modifications to accommodate the multimedia engine of the present invention. A second level or L2 cache memory (not shown) may be coupled to a cache controller in the chipset, as desired. The bridge or chipset 106 couples through a memory bus 108 to main memory 110. The main memory 110 is preferably DRAM (dynamic random access memory) or EDO (extended data out) memory, or other types of memory, as desired.

The host/PCI/cache bridge 106 and the main memory 110 also couple through the memory bus 108 to the multimedia engine 112 according to the present invention. The multimedia engine 112 performs video and audio processing functions. As shown, the multimedia engine 112 preferably includes a video port 172 for coupling to a video monitor 114 and an audio port 174 which couples through an audio digital to analog converter (audio DAC) 115 to speakers 116. The audio DAC 115 includes a D/A converter, such as those available from Crystal Semiconductor of Austin, Tex. The multimedia engine 112 may also include a communications port. In the embodiment shown in FIG. 1, the multimedia engine 112 also includes multimedia memory 160. In the embodiment shown in FIG. 4, the multimedia memory 160 is separate from the multimedia engine 112.

The host/PCI/cache bridge or chipset 106 also interfaces to a peripheral component interconnect (PCI) bus 120. In the preferred embodiment, a PCI local bus is used. However, it is noted that other local buses may be used, such as the VESA (Video Electronics Standards Association) VL bus. Various types of devices may be connected to the PCI bus 120. In the embodiment shown in FIG. 1, a hard disk 122 and a network interface controller 124 are coupled to the PCI bus 120. A SCSI (small computer systems interface) adapter 126 may also be coupled to the PCI bus 120, as shown. The SCSI adapter 126 may couple to various SCSI devices, such as a CD-ROM drive and a tape drive (both not shown), as desired. Various other devices may be connected to the PCI bus 120, as is well known in the art.

Expansion bus bridge logic 150 is also preferably coupled to the PCI bus 120. The expansion bus bridge logic 150 interfaces to an expansion bus 152. The expansion bus 152 may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, such as expansion bus memory or a modem (both not shown). The expansion bus bridge logic 150 also couples to a peripheral expansion bus (not shown). The peripheral expansion bus is used for connecting various peripherals to the computer system, including an interrupt system, a real time clock (RTC) and timers, a direct memory access (DMA) system, and ROM/Flash memory (all not shown). Other peripherals (not shown) are preferably connected to the peripheral expansion bus, including communications ports, diagnostics ports, command/status registers, and non-volatile static random access memory (NVSRAM).

Figure 4:
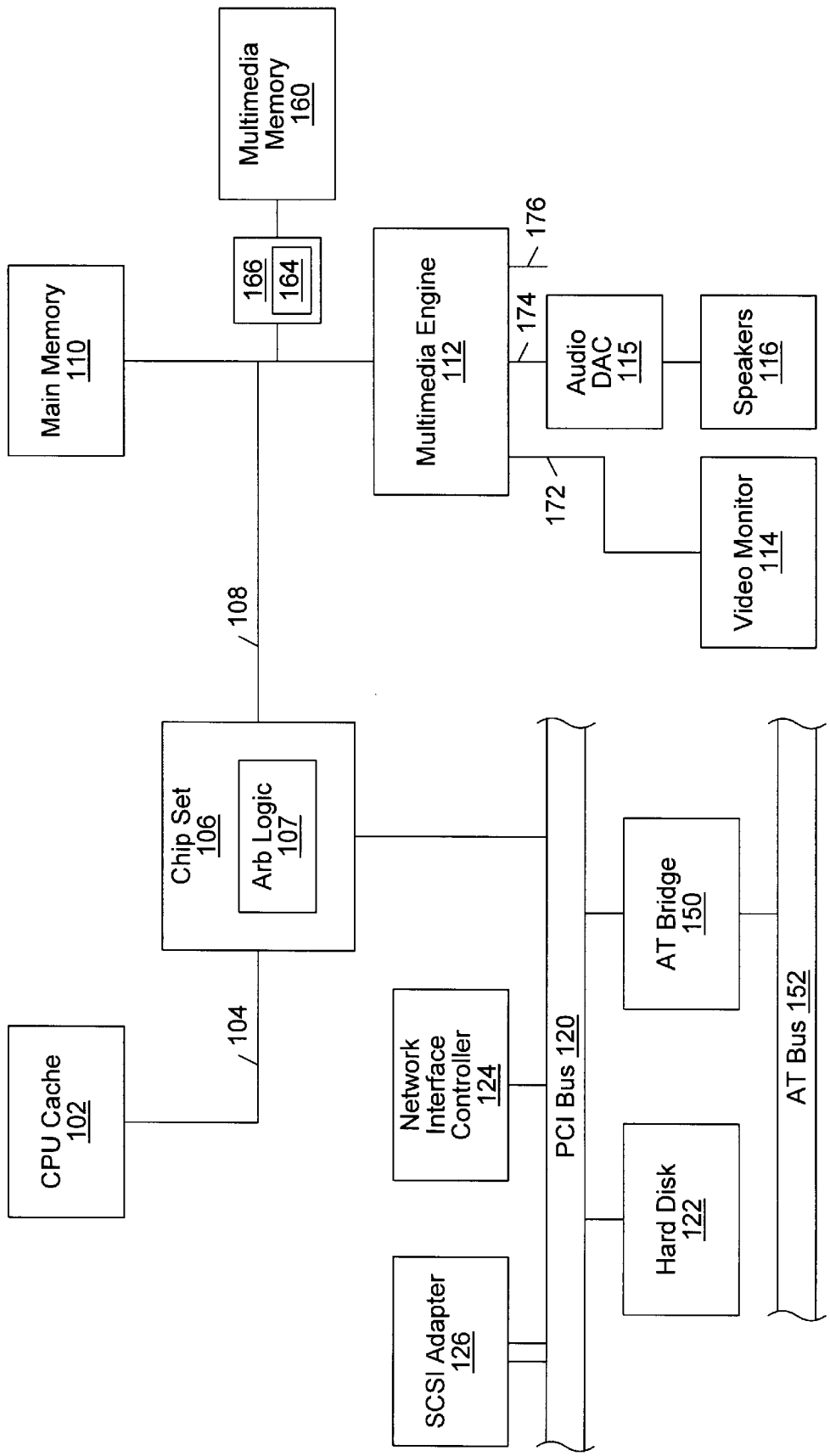
FIG. 4 is a block diagram of a computer system including a multimedia engine and separate multimedia memory according to an alternate embodiment of the present invention.
Figure 5:
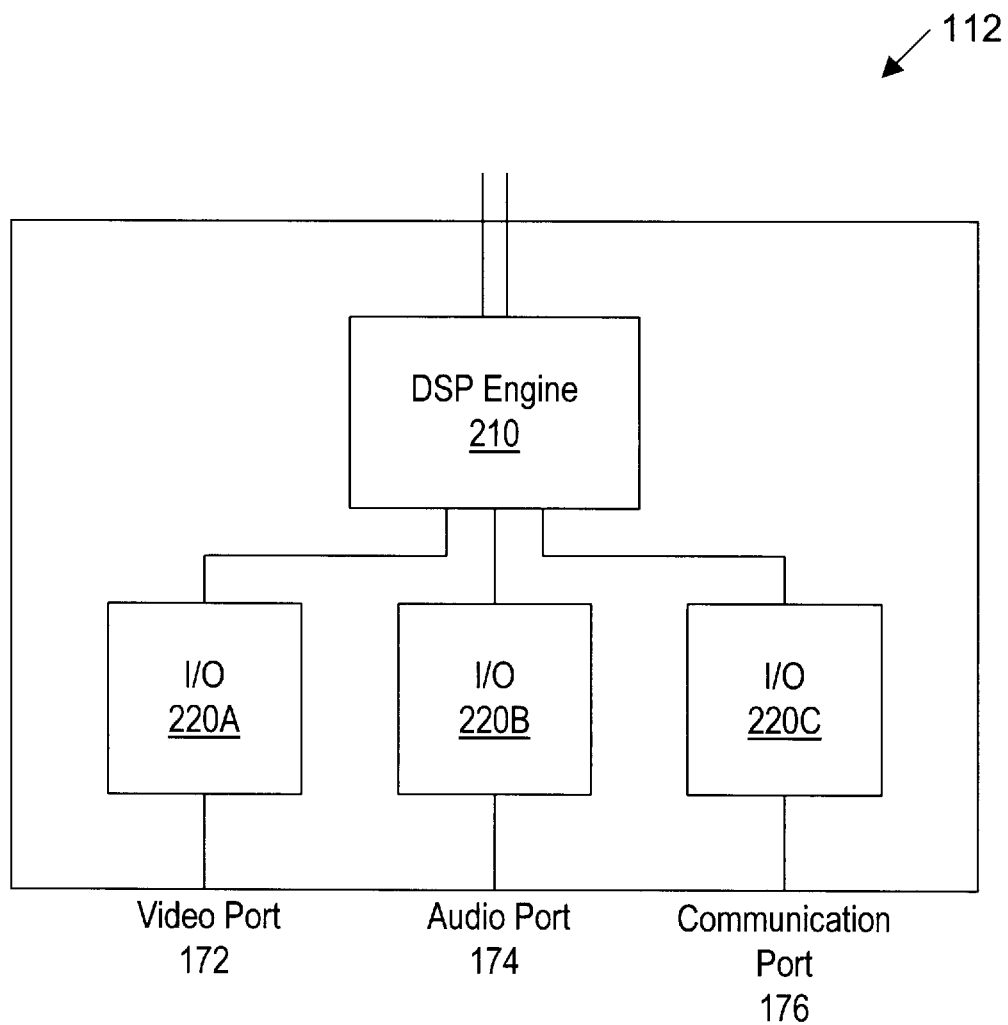
FIG. 5 is a block diagram of the multimedia engine of FIG. 4.

Referring now to FIG. 4, an alternate embodiment of the computer system is shown. In the embodiment of FIG. 4, the multimedia memory 160 is coupled through arbiter block 161 to the local bus 108. The arbiter block 161 performs arbitration between the CPU 102 and the multimedia engine 112 for the multimedia memory. The arbiter logic 161 preferably includes a DMA (direct memory access) engine 164 which performs transfers between the main memory 110 and the multimedia memory 160.

Figure 6:
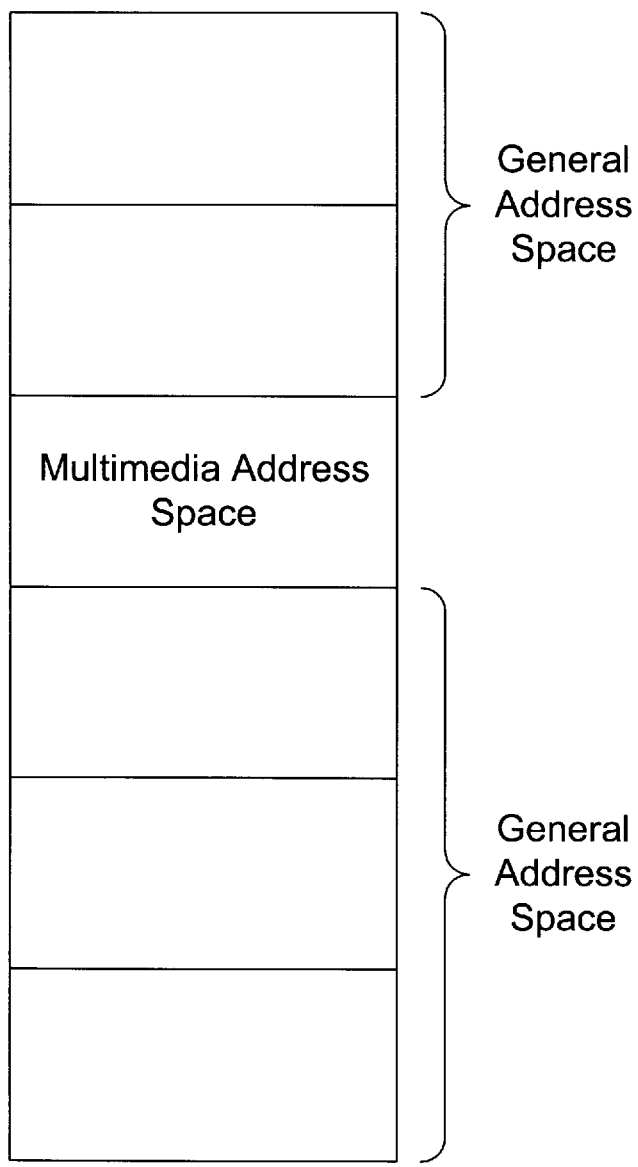
FIG. 6 illustrates the main memory address space of the main memory and the multimedia memory.

In the embodiments of FIG. 1 and FIG. 4, the multimedia memory 160 is mapped to the main memory address space and thus comprises a portion of the main memory address space, as shown in FIG. 6. Thus the multimedia memory 160 is available to store non-multimedia data as needed. In other words, if the main memory 110 becomes full and additional memory is needed, the CPU 102 can store code and data in the multimedia memory 160. Thus, the multimedia memory 160 is used for real-time or multimedia data and is also used by the CPU 102 as overflow memory space.

Multimedia Engine Block Diagram

Figure 2:
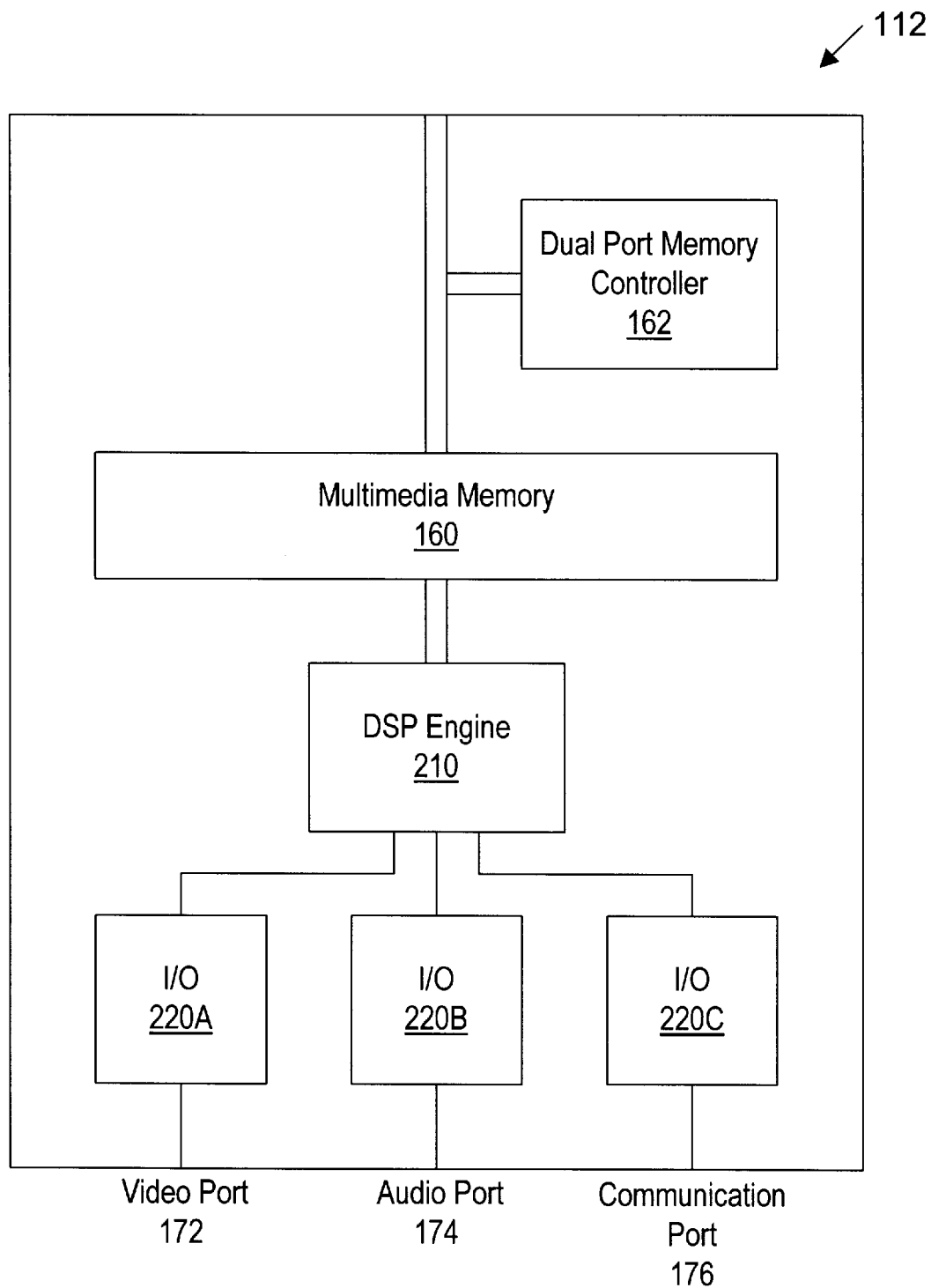
FIG. 2 is a block diagram of the multimedia engine of FIG. 1.

Referring now to FIG. 2, a more detailed block diagram illustrating the multimedia engine 112 is shown. In the embodiment shown in FIG. 2, the multimedia engine 112 includes multimedia memory 160. In the embodiment shown in FIG. 4, the multimedia engine 112 does not include the multimedia memory 160, but rather the multimedia memory 160 is separate from the multimedia engine 112.

In the embodiment of FIG. 2, the multimedia memory 160 is dual ported memory. In this embodiment, a first port of the memory 160 couples through the local bus 108 to the main memory 110. The second port of the multimedia memory 160 couples to one or more DSP engines 210. The multimedia memory 160 preferably comprises high speed dual ported VRAM (video random access memory), or dual ported DRAM (dynamic random access memory). The multimedia engine 112 preferably includes a dual port DRAM memory controller 162 for controlling the dual port memory functions of the multimedia memory 160. For more information on the operation of a dual port memory controller, please see the Intel 8207 Dual-Port Dynamic RAM Controller Data Sheet (Order No. 210463-007), available from Intel Corporation, which is hereby incorporated by reference.

In the preferred embodiment shown in FIG. 2, the multimedia engine 112 includes one DSP engine 210 which preferably performs video and audio processing functions. In the preferred embodiment, the DSP engine 210 is a general purpose DSP engine that performs both video and audio processing functions as well as other real-time functions. In one embodiment, the DSP engine 210 includes one or more ROMs which store microcode corresponding to video and audio processing instructions or commands. The DSP engine 210 preferably performs video and graphics functions such as polygon rendering and texture mapping, among others. The DSP engine 210 preferably performs audio functions such as MIDI and wavetable synthesis, among others. The DSP engine 210 may also perform communication functions, such as ISDN connectivity or modem functionality, as desired.

Alternate embodiments of the multimedia engine 112 include two or more DSP engines. One embodiment includes three separate hardware engines, including a video or graphics accelerator engine, an audio engine, and a communications or modem engine.

The one or more DSP engines 210 couple to one or more I/O channels 220. In the preferred embodiment shown in FIG. 2, the multimedia engine 112 includes three I/O channels 220A, 220B, and 220C. I/O channel 220A is preferably a dedicated video channel and couples to video port outputs 172 of the multimedia engine 112. I/O channel 220B is preferably a dedicated audio channel and couples to audio port 174 of the multimedia engine 112. I/O channel 220C couples to communication port 176 of the multimedia engine 112. In one embodiment, the video and audio I/O channels 220A and 220B are synchronized with each other to ensure synchronized audio and video during multimedia presentations.

In the preferred embodiment, the multimedia engine 112 includes video processing circuitry and/or firmware, including a random access memory digital to analog converter (RAMDAC), for converting video data into appropriate analog signals, preferably red, green and blue (RGB) signals, for output directly to video monitor 114. In an alternate embodiment, the DSP engine 210 provides digital video pixel data through I/O channel 220A to the video port 172, and a separate RAMDAC and associated logic circuitry (not shown) receives the video pixel data from the video port 172 and generates the appropriate RGB signals to drive the display monitor 114.

In the preferred embodiment, the DSP engine 210 generates digital audio data that is provided through the I/O channel 220B to the audio port 174. A separate audio digital to analog converter (audio DAC) (115 FIG. 1) is preferably connected to the audio port 174 and converts the digital audio data to the appropriate analog signals to drive one or more speakers 116. Alternatively, the audio DAC functions are included within the multimedia engine 112.

Figure 3:
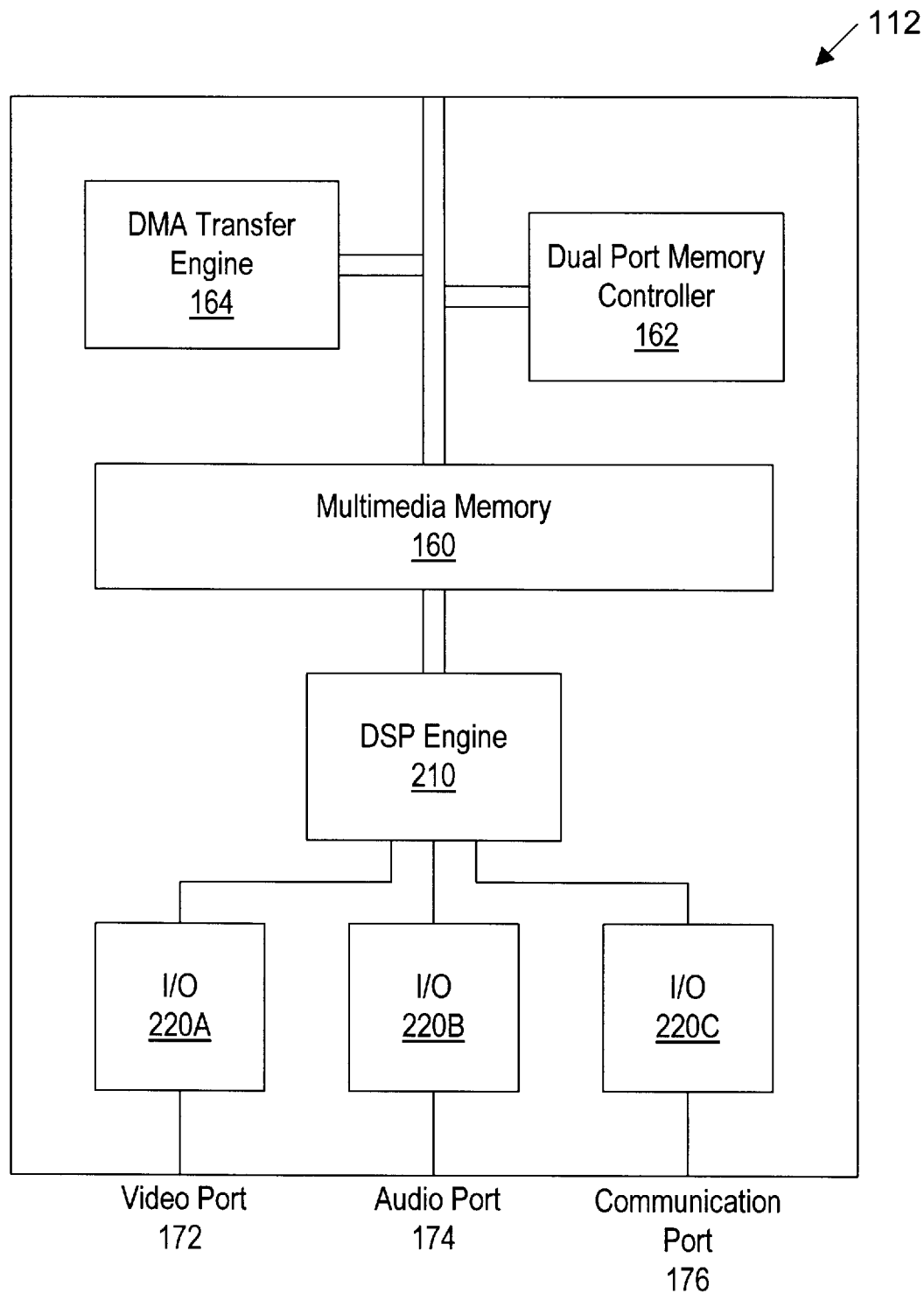
FIG. 3 is a block diagram of an alternate embodiment of the multimedia engine of FIG. 1.

In the embodiment shown in FIG. 3, the multimedia engine 112 also includes a DMA transfer engine 164 which performs data transfers from the main memory 110 to the multimedia memory 160. The DMA transfer engine 164 preferably transfers data from the main memory 110 to the multimedia memory 160 contemporaneously with operations performed by the one or more DSP engines 210. In one embodiment, the multimedia memory 160 is partitioned into two or more separate address spaces or buffers, and the DMA engine 164 transfers data from main memory 110 to a first address space or buffer in the multimedia memory 160 while the DSP engine 210 accesses commands and data from the other address space or buffer.

Arbitration Logic

The chipset 106 preferably includes the arbitration logic 107 which determines access to the main memory 110. The arbitration logic 107 is coupled to the CPU 102, the main memory 110 and the multimedia engine 112. The arbitration logic 107 receives bus requests from each of the CPU 102 and the multimedia engine 112 and grants main memory access to either of the CPU 102 or the multimedia engine 112. In the preferred embodiment, the CPU 102 has priority access to the main memory 110. Alternatively, the local bus 108 is an isochronous bus where each of the CPU 102 and the multimedia engine 112 have guaranteed bandwidth and latency on the bus 108 to the main memory 110. Alternative arbitration schemes such as a round robin or priority based scheme may be used as desired.

As mentioned above, the main memory 110 and the multimedia memory 160 preferably share a common address space. FIG. 6 illustrates the main memory address space, wherein the multimedia memory 160 comprises part of the main memory address space. Thus the multimedia memory 160 is available to store non-multimedia data as needed. In this embodiment, the multimedia engine 112 and CPU 102 must also arbitrate for access to the multimedia memory 160. The multimedia engine 112 preferably has priority access to the multimedia memory 160. In one embodiment, the multimedia engine 112 simply writes one or more bits to a register in the arbitration logic 107 to gain control of the multimedia memory 160, and the CPU 102 is only granted access to the multimedia memory 160 after a certain starvation period.

Computer System Operation

Figure 7:
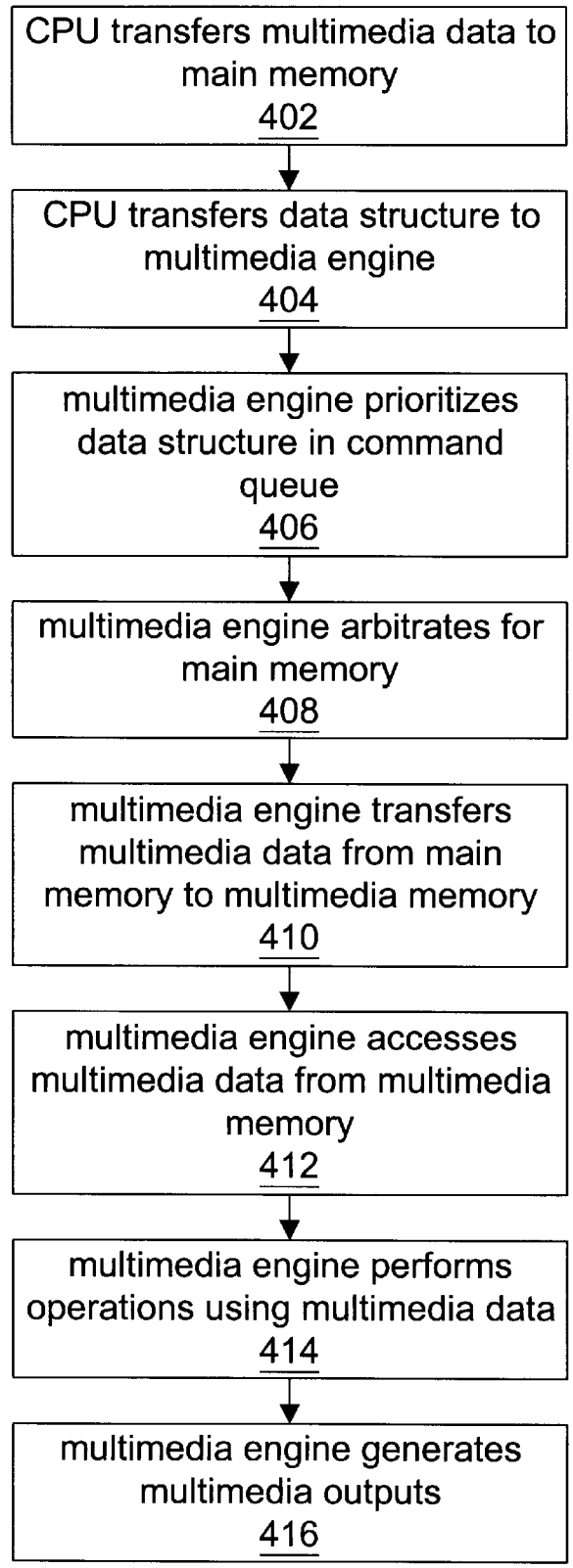
FIG. 7 is a flowchart diagram illustrating operation of the computer system of the present invention.

FIG. 7 is a flowchart diagram illustrating operation of the present invention. In the preferred embodiment, the main memory 110 stores the operating system and applications software as well as driver software, including video drivers and audio drivers. The CPU 102 executes applications software and driver software from the main memory 110 and generates real-time or multimedia data. In the present disclosure, the term "multimedia data" refers to video or graphical data, audio data, telephony data, and other types of real-time or communication data.

When an application executing on the CPU 102 generates multimedia data, the CPU 102 writes the multimedia data to the main memory 110 in step 402. The multimedia data includes data and may include one or more commands that perform operations on the data. The CPU 102 then provides a data structure directly to the multimedia engine 112 in step 404, preferably to the multimedia memory 160 in the multimedia engine 112. The data structure comprises location information regarding the multimedia data and may also include high level instructions or commands regarding the nature or purpose of the data.

In step 406 the multimedia engine 112 prioritizes the data structure with other real-time data structures that have already been received. Thus the multimedia engine 112 intelligently prioritizes received multimedia data structures based on a desired priority scheme and the available resources. Thus, the video and audio components of a multimedia presentation may receive a higher priority than a telephony application that can be performed in the background. In an alternate embodiment, the multimedia engine 112 does not prioritize received data structures or commands, but rather merely acts as a slave and executes received data structures in the order they are received.

In step 408 the multimedia engine 112 arbitrates for access to the main memory 110. This involves asserting a bus request signal to the arbitration logic 107 in the chipset 106. The multimedia engine 112 may also provide a priority byte to the arbitration logic 107 which is used by the arbitration logic 107 in determining the arbitration. Once the multimedia engine achieves access to main memory 110, the multimedia engine 210 uses the data structure received from the CPU 102 to access the multimedia data from main memory 110 and store the data in the multimedia memory 160.

In one embodiment, the CPU 102 writes video or audio instructions or commands to the main memory 110 in conjunction with the corresponding video and/or audio data. In this embodiment, the CPU 102 writes only pointer information to the multimedia memory 160 which points to the beginning address in main memory 110 where the data and commands reside. The pointer information includes the beginning address of the data, the length or number of bytes of the data, as well as other information. In step 410 the multimedia engine 112 uses the pointer information to retrieve the commands and data from main memory 110 into multimedia memory 160.

In an alternate embodiment, the data structure received by the multimedia engine 112 from the CPU 102 also includes the actual graphical and/or audio commands used by the DSP engine 210 to process the video or audio data and to produce the appropriate signals at the video and audio ports 172 and 174.

In the embodiment shown in FIG. 3, the multimedia engine 112 includes a dedicated DMA (direct memory access) engine 164 which reads pointer information from a designated address space in the multimedia memory 160 and retrieves the commands and data from the main memory 110 to the multimedia memory 160 using high speed burst transfers. In one embodiment, the multimedia memory 160 is separated into two or more address spaces or buffers, and the DMA engine 164 retrieves multimedia data into one address space or buffer while the DSP engine 210 accesses commands and data from the other address space or buffer. This ensures that the DSP engine 210 has uninterrupted access to commands and data in the multimedia memory 160 while also allowing the DMA engine 164 to simultaneously retrieve real-time commands and data to the multimedia memory 160.

Once real-time or multimedia data and commands have been placed in the multimedia memory 160, either by the CPU 102 or retrieved from main memory 110, in step 412 the one or more DSP engines 210 in the multimedia engine 112 read the commands and data from the multimedia memory 160 and in step 414 perform the necessary graphics and audio processing functions. The multimedia engine 112 then generates the appropriate video and audio signals to the video and audio ports 172 and 174 in step 416. In one embodiment, the multimedia memory 160 is partitioned into separate address spaces for commands and data, and the DSP engine 210 retrieves commands from a first address space and retrieves data from a second address space.

The CPU 102 preferably writes video and/or audio commands and data to the main memory 110 instead of directly to the multimedia memory 160 in order to minimize CPU accesses to the multimedia memory 160. This ensures that the DSP engine 210 has full access to the multimedia memory 160 for real-time processing. Further, the DSP engine 210 retrieves commands and data from the main memory 110 only when necessary, and the DSP engine 210 is not "locked out" of the multimedia memory 160 due to CPU writes to the multimedia memory 160.

In an alternate embodiment, the CPU 102 writes video and/or audio data and commands directly to the multimedia memory 160. In this embodiment, the CPU executes applications software and driver software from the main memory 110 and writes any associated video and audio data directly to the multimedia memory 160 in the multimedia engine 112. The driver software also writes high level commands directly to the multimedia memory 160. Thus, the video drivers write high level commands to the multimedia memory 160 in a similar manner to current PCI-based graphics acceleration cards.

In one embodiment, as described above, the multimedia memory 160 is separated into two or more address spaces or buffers, and the CPU 102 writes to one address space or buffer while the DSP engine 210 accesses commands and data from the other address space or buffer. This ensures that the DSP engine 210 has uninterrupted access to commands and data in the multimedia memory 160 while also allowing the CPU 102 to directly write real-time commands and data to the multimedia memory 160.

Alternate embodiment

Figure 8:
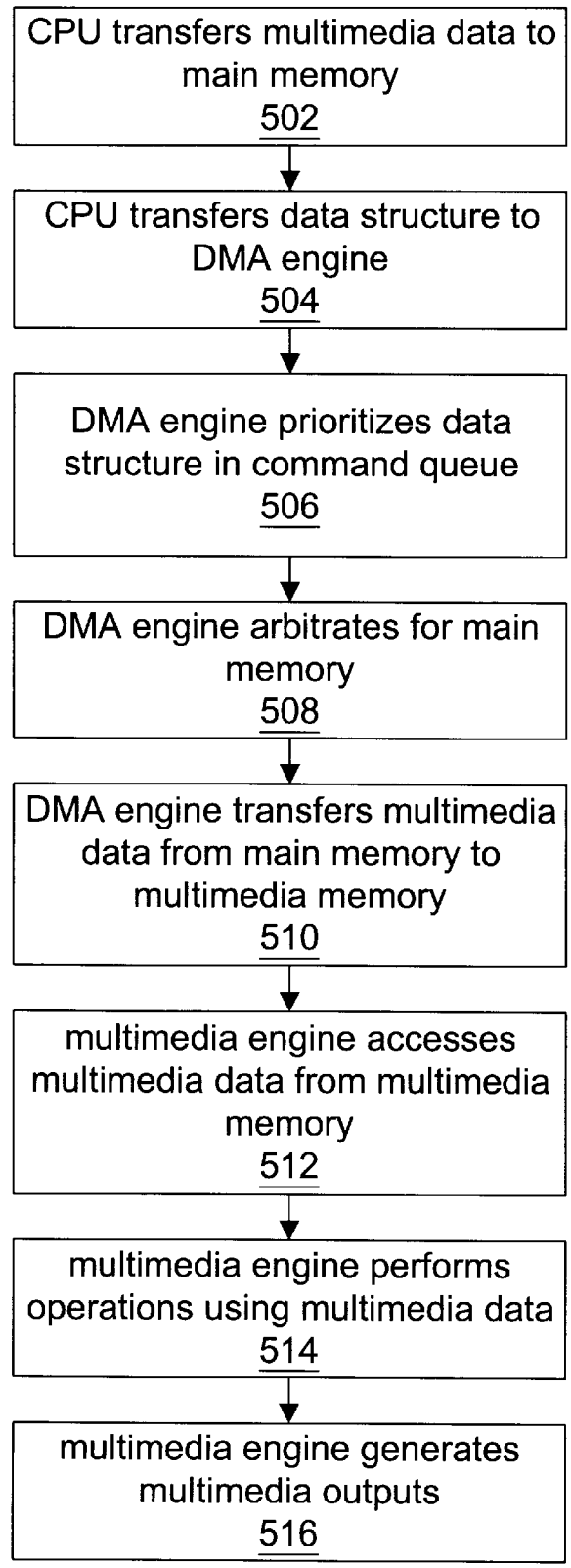
FIG. 8 is a flowchart diagram illustrating operation of the computer system of the present invention according to an alternate embodiment.

FIG. 8 is a flowchart diagram illustrating operation of an alternate embodiment of the present invention, wherein the DMA engine 164 retrieves multimedia commands and data into the multimedia memory. The flowchart describes operations for either FIGS. 1/3 and FIG. 4. When an application executing on the CPU 102 generates multimedia data, the CPU 102 writes the multimedia data to the main memory 110 in step 502. The multimedia data includes data and may include one or more commands that perform operations on the data.

The CPU 102 then provides a data structure to the DMA engine 164 in step 504. In one embodiment, the CPU 102 provides the data structure to an address space in the multimedia memory 160 accessible by the DMA engine 164. The data structure comprises location information regarding the multimedia data, including the beginning address of the data, the length or number of bytes of the data, as well as other information. Alternatively, the CPU 102 provides the data structure to buffers within the DMA engine 164.

In step 506 the DMA engine 164 prioritizes the data structure with other real-time data structures that have already been received. Thus the DMA engine 164 intelligently prioritizes received multimedia data structures based on a desired priority scheme and the available resources. In an alternate embodiment, the DMA engine 164 does not prioritize received data structures or commands, but rather merely acts as a slave and executes received data structures to transfer multimedia data in the order the data structures are received.

In step 508 the DMA engine 164 arbitrates for access to the main memory 110. This involves asserting a bus request signal to the arbitration logic 107 in the chipset 106. The DMA engine 164 may also provide a priority byte to the arbitration logic 107 which is used by the arbitration logic 107 in determining the arbitration. Once the DMA engine 164 achieves access to main memory 110, the DMA engine 164 uses the data structure received from the CPU 102 to access the multimedia data from main memory 110 and store the data in the multimedia memory 160.

In this embodiment, the CPU 102 writes video or audio instructions or commands to the main memory 110 in conjunction with the corresponding video and/or audio data, and the CPU 102 writes only location information to the DMA engine 164 which references the location in main memory 110 where the data and commands reside. In step 510 the DMA engine 164 uses the location information to retrieve the commands and data from main memory 110 into multimedia memory 160. The DMA engine 164 preferably retrieves the data using high speed burst transfers.

In one embodiment, as described above, the multimedia memory 160 is separated into two or more address spaces or buffers, and the DMA engine 164 retrieves multimedia data into one address space or buffer while the DSP engine 210 accesses commands and data from the other address space or buffer. This ensures that the DSP engine 210 has uninterrupted access to commands and data in the multimedia memory 160 while also allowing the DMA engine 164 to simultaneously retrieve real-time commands and data to the multimedia memory 160.

The CPU 102 preferably writes video and/or audio commands and data to the main memory 110 instead of directly to the multimedia memory 160 in order to minimize CPU accesses to the multimedia memory 160. This ensures that the DSP engine 210 has full access to the multimedia memory 160 for real-time processing.

Once real-time or multimedia data and commands have been placed in the multimedia memory 160 by the DMA engine 164, in step 512 the one or more DSP engines 210 in the multimedia engine 112 read the commands and data from the multimedia memory 160 and in step 514 perform the necessary graphics and audio processing functions. The multimedia engine 112 then generates the appropriate video and audio signals to the video and audio ports 172 and 174 in step 516. In one embodiment, the multimedia memory 160 is partitioned into separate address spaces for commands and data, and the DSP engine 210 retrieves commands from a first address space and retrieves data from a second address space.

Conclusion

Therefore, the present invention comprises a novel computer system architecture which increases the performance of real-time applications. A dedicated multimedia engine is coupled directly to the main memory, and the multimedia engine includes dedicated multimedia memory which is part of the main memory address space. This allows the multimedia memory to be used for multimedia data as well as for additional main memory storage.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing multimedia operations in a computer system, wherein the computer comprises a CPU, main memory coupled to the CPU which stores data accessible by the CPU, a multimedia engine coupled to the main memory and coupled to the CPU, and a multimedia memory coupled to the CPU, the main memory, and the multimedia engine, wherein the multimedia memory stores multimedia data including data and one or more commands, the method comprising:

the CPU transferring multimedia data to the main memory;

the CPU transferring a data structure to the multimedia engine, wherein said data structure includes multimedia data location information indicating a location in the main memory where said multimedia data was stored in said step of transferring;

the multimedia engine transferring the multimedia data from the main memory to the multimedia memory, wherein the multimedia engine uses said multimedia data location information in said data structure to access said multimedia data in the main memory, wherein the multimedia engine transfers the one or more commands from the main memory when necessary;

the multimedia engine accessing said multimedia data from the multimedia memory;

the multimedia engine performing operations using said multimedia data concurrently with and after said step of accessing said multimedia data from the multimedia memory; and the multimedia engine generating video and/or audio outputs in response to said step of performing operations using said multimedia data.

2. The method of claim 1, wherein the multimedia engine includes one or more DSP engines;

wherein the multimedia memory comprises dual ported memory including a first port coupled through a bus to the main memory and a second port coupled to the one or more DSP engines in the multimedia engine; the method further comprising:

the multimedia engine transferring first multimedia data from the main memory to the multimedia memory; and the multimedia engine accessing second multimedia data from the multimedia memory contemporaneously with said step of the multimedia engine transferring said first multimedia data from the main memory to the multimedia memory.

3. The method of claim 2, wherein the multimedia memory includes a plurality of address space portions including a first address space portion and a second address space portion;

wherein the multimedia engine transfers said first multimedia data from the main memory to one of said first or second address space portions in said multimedia memory;

wherein said multimedia engine accesses said second multimedia data from the other of said first and second address space portions contemporaneously with said transfer of said first multimedia data from the main memory to said one of said first or second address space portions in said multimedia memory.

4. The method of claim 2, wherein said multimedia engine includes a direct memory access engine;

wherein said step of the multimedia engine transferring the multimedia data from the main memory to the multimedia memory comprises the direct memory access engine transferring the multimedia data from the main memory to the multimedia memory.

5. The method of claim 4, wherein said step of the CPU transferring said data structure including said multimedia data location information to the multimedia engine comprises the CPU transferring said data structure including said multimedia data location information to the direct memory access engine in the multimedia engine.

6. The method of claim 1, wherein said multimedia location information includes a beginning main memory address of said multimedia data and a number of bytes of said multimedia data.

7. The method of claim 1, wherein said data structure includes said multimedia data location information and includes a priority value indicating a relative priority of said multimedia data.

8. The method of claim 7, wherein said multimedia engine includes a command queue for storing a plurality of said data structures, the method further comprising:

prioritizing said data structure in said command queue based on said priority value comprised in said data structure, wherein said step of prioritizing occurs prior to said step of the direct memory access transfer engine transferring the multimedia data from the main memory to the multimedia memory.

9. The method of claim 1, wherein said multimedia data comprises data and one or more commands, wherein said commands indicate desired operations on said data.

10. The method of claim 1, wherein said multimedia memory for storing multimedia data and said main memory comprise a common address space.

11. The method of claim 1, wherein said multimedia data includes video data.

12. The method of claim 1, wherein said multimedia data includes audio data.

13. The method of claim 1, wherein the computer system further comprises arbitration logic coupled to said CPU, said main memory and said multimedia engine, wherein said arbitration logic receives main memory access requests from each of said CPU and said multimedia engine and grants main memory access to either of said CPU or said multimedia engine, the method further comprising:

the multimedia engine requesting access to the main memory prior to said step of the multimedia engine transferring the multimedia data from the main memory to the multimedia memory;

the arbitration logic granting the multimedia engine access to the main memory prior to said step of the multimedia engine transferring the multimedia data from the main memory to the multimedia memory.

14. The method of claim 1, wherein the multimedia memory is mapped as a contiguous portion of the main memory, the method further comprising:

the CPU transferring multimedia data to the multimedia memory.

15. A method for performing multimedia operations in a computer system, wherein the computer comprises a CPU, main memory coupled to the CPU which stores data accessible by the CPU, a multimedia engine coupled to the main memory and coupled to the CPU, a multimedia memory coupled to the CPU, the main memory, and the multimedia engine, wherein the multimedia memory stores multimedia data including data and one or more commands, and a direct memory access engine coupled to the multimedia memory and the main memory through the memory bus, the method comprising:

the CPU transferring a data structure to the direct memory access transfer engine, wherein said data structure includes multimedia data location information indicating a location in the main memory where said multimedia data was stored in said step of transferring;

the direct memory access transfer engine transferring the multimedia data from the main memory to the multimedia memory, wherein the direct memory access transfer engine uses said multimedia data location information in said data structure to access said multimedia data in the main memory, wherein the direct memory transfer engine transfers the one or more commands from the main memory when necessary;

the multimedia engine accessing said multimedia data from the multimedia memory;

the multimedia engine performing operations using said multimedia data concurrently with and after said step of accessing said multimedia data from the multimedia memory; and the multimedia engine generating video and/or audio outputs in response to said step of performing operations using said multimedia data.

16. The method of claim 15, wherein the multimedia engine includes one or more DSP engines;

wherein the multimedia memory comprises dual ported memory including a first port coupled to the main memory and a second port coupled to the one or more DSP engines in the multimedia engine; the method further comprising:

the multimedia engine transferring first multimedia data from the main memory to the multimedia memory; and the multimedia engine accessing second multimedia data from the multimedia memory contemporaneously with said step of the multimedia engine transferring said first multimedia data from the main memory to the multimedia memory.

17. The method of claim 16, wherein the multimedia memory includes a plurality of address space portions including a first address space portion and a second address space portion;

wherein the direct memory access transfer engine transfers said first multimedia data from the main memory to one of said first or second address space portions in said multimedia memory;

wherein said multimedia engine accesses said second multimedia data from the other of said first and second address space portions contemporaneously with said transfer of said first multimedia data from the main memory to said one of said first or second address space portions in said multimedia memory.

18. The method of claim 15, wherein said multimedia location information includes a beginning main memory address of said multimedia data and a number of bytes of said multimedia data.

19. The method of claim 15, wherein said data structure includes said multimedia data location information and includes a priority value indicating a relative priority of said multimedia data.

20. The method of claim 19, wherein said multimedia engine includes a command queue for storing a plurality of said data structures, the method further comprising:

prioritizing said data structure in said command queue based on said priority value comprised in said data structure, wherein said step of prioritizing occurs prior to said step of the direct memory access transfer engine transferring the multimedia data from the main memory to the multimedia memory.

21. The method of claim 15, wherein the computer system further comprises arbitration logic coupled to said CPU, said main memory and said multimedia engine, wherein said arbitration logic receives main memory access requests from each of said CPU and said multimedia engine and grants main memory access to either of said CPU or said multimedia engine, the method further comprising:

the multimedia engine requesting access to the main memory prior to said step of the multimedia engine transferring the multimedia data from the main memory to the multimedia memory;

the arbitration logic granting the multimedia engine access to the main memory prior to said step of the multimedia engine transferring the multimedia data from the main memory to the multimedia memory.

22. The method of claim 15, wherein said multimedia data comprises data and one or more commands, wherein said commands indicate desired operations on said data.

23. The method of claim 15, wherein said multimedia memory for storing multimedia data and said main memory comprise a common address space.

24. A computer system, comprising:

a CPU;

main memory coupled to the CPU which stores data accessible by the CPU;

a multimedia engine coupled to the main memory and coupled to the CPU, wherein said multimedia engine comprises:

memory for storing multimedia data, wherein said memory for storing multimedia data includes a first port coupled to said main memory and a second port;

one or more DSP engines coupled to said second port of said memory, wherein said one or more DSP engines process said multimedia data stored in said multimedia memory;

one or more input/output channels coupled to said one or more DSP engines for transmitting data;

a video port coupled to at least one of said one or more input/output channels, wherein said video port is adapted for coupling to a video monitor; and an audio port coupled to at least one of said one or more input/output channels, wherein said audio port is adapted for transferring audio data;

wherein said CPU includes:

means for transferring multimedia data to the main memory; and means for transferring a data structure to the multimedia engine, wherein said data structure includes multimedia data location information indicating a location in the main memory where said multimedia data was stored in said step of transferring;

wherein said multimedia engine includes:

means for transferring the multimedia data from the main memory to the multimedia memory, wherein the multimedia engine uses said multimedia data location information in said data structure to access said multimedia data in the main memory;

means for accessing said multimedia data from the multimedia memory; and means for performing operations using said multimedia data after said step of accessing said multimedia data from the multimedia memory, wherein said means for accessing said multimedia data from the multimedia memory and said means for performing operations using said multimedia data are configured to operate concurrently, and wherein said multimedia data comprises data and one or more commands, wherein said multimedia engine transfers the one or more commands from said main memory when necessary.

25. The computer system of claim 24, further comprising:

arbitration logic coupled to said CPU, said main memory and said multimedia engine, wherein said arbitration logic receives main memory access requests from each of said CPU and said multimedia engine and grants main memory access to either of said CPU or said multimedia engine.

26. The computer system of claim 24, wherein said means for transferring the multimedia data from the main memory to the multimedia memory in said multimedia engine comprises a direct memory access engine.

27. The computer system of claim 24, wherein one of the one or more DSP engines of the multimedia engine includes video processing circuitry, including a RAMDAC for converting video data into appropriate analog signals, wherein the video processing circuitry is coupled to the video port coupled to the at least one of the one or more input/output channels.

28. The computer system of claim 24, wherein one of the one or more DSP engines of the multimedia engine includes a separate audio digital to audio converter (DAC) for converting digital audio signals into appropriate analog signals, wherein the audio DAC is coupled to the audio port coupled to the at least one of the one or more input/output channels.

29. The computer system of claim 24, wherein the CPU further includes means for accessing the multimedia memory.

* * * * *

UNITED STATES PATENT AND TRADEMARK OFFICE
CERTIFICATE OF CORRECTION

PATENT NO. : 5,870,622
DATED : February 9, 1999
INVENTOR(S) : Dale Gulick, Andy Lambrecht, Mike Webb, Larry Hewitt, and Brian Barnes It is certified that error appears in the above-identified patent and that said Letters Patent is hereby corrected as shown below:

In The Claims:

Claim 15, col.12, line 20, please insert missing sentence on the next line following comprising:

"the CPU transferring multimedia data to the main memory;"

Signed and Sealed this

First Day of June, 1999

Attest:

Q. TODD DICKINSON

*Attesting Officer*      *Acting Commissioner of Patents and Trademarks*